(12) United States Patent  
Kuebler et al.

(10) Patent No.: US 7,338,346 B2
(45) Date of Patent: Mar. 4, 2008

(54) METHOD AND APPARATUS FOR PRODUCING OPTICAL GLASSES

(75) Inventors: Christoph Kuebler, Oberkochen (DE); Thomas Koehle, Aalen-Ebnat (DE); Manfred Kaaz, Oberkochen (DE); Christian Bess, Aalen-Ebnat (DE)

(73) Assignee: Carl Zeiss Vision GmbH, Aalen (DE)

( * ) Notice: Subject to any disclaimer, the term of this patent is extended or adjusted under 35 U.S.C. 154(b) by 0 days.

(21) Appl. No.: 11/637,845

(22) Filed: Dec. 12, 2006

(65) Prior Publication Data

US 2007/0093184 A1    Apr. 26, 2007

Related U.S. Application Data

(60) Division of application No. 11/113,451, filed on Apr. 22, 2005, now Pat. No. 7,153,184, which is a continuation of application No. PCT/EP03/11827, filed on Oct. 24, 2003.

(30) Foreign Application Priority Data

Oct. 25, 2002   (DE) ................ 102 50 856

(51) Int. Cl.
B24B 49/00        (2006.01)
(52) U.S. Cl. ............................ 451/5; 451/11
(58) Field of Classification Search ............ 451/5, 451/8, 9, 10, 11, 24
See application file for complete search history.

(56) References Cited

U.S. PATENT DOCUMENTS 5,205,083 A * 4/1993 Pettibone ............ 451/42
5,247,999 A   9/1993 Fowler
5,577,950 A * 11/1996 Smith et al. .......... 451/42
6,247,999 B1  6/2001 Tokiwa

FOREIGN PATENT DOCUMENTS

| DE | 198 15 728 A1 | 10/1999 |
|----|---------------|---------|
| DE | 101 00 860 A1 | 8/2001 |
| DE | 102 48 104 A1 | 5/2003 |
| EP | 0 567 894 B1 | 11/1993 |
| EP | 0 974 422 B1 | 1/2000 |
| EP | 0 974 423 B1 | 1/2000 |
| EP | 0 982 098 A2 | 3/2000 |
| EP | 0 758 571 B1 | 9/2005 |
| WO | WO 97/13603 | 4/1997 |
| WO | WO 01/56740 A1 | 8/2001 |
| WO | WO 01/66308 A1 | 9/2001 |
| WO | WO 02/00392 A1 | 1/2002 |
| WO | WO 03/033205 A1 | 4/2003 |

* cited by examiner

Primary Examiner—Jacob K. Ackun, Jr.
(74) Attorney, Agent, or Firm—Harness, Dickey & Pierce, P.L.C.

(57) ABSTRACT

The invention relates to a method and an apparatus for producing optical glasses. The glasses are polished and marked, following a shaping process. The polishing and marking steps are carried out in a common processing cell which comprises a polishing station, a washing station, and a marking station.

32 Claims, 11 Drawing Sheets

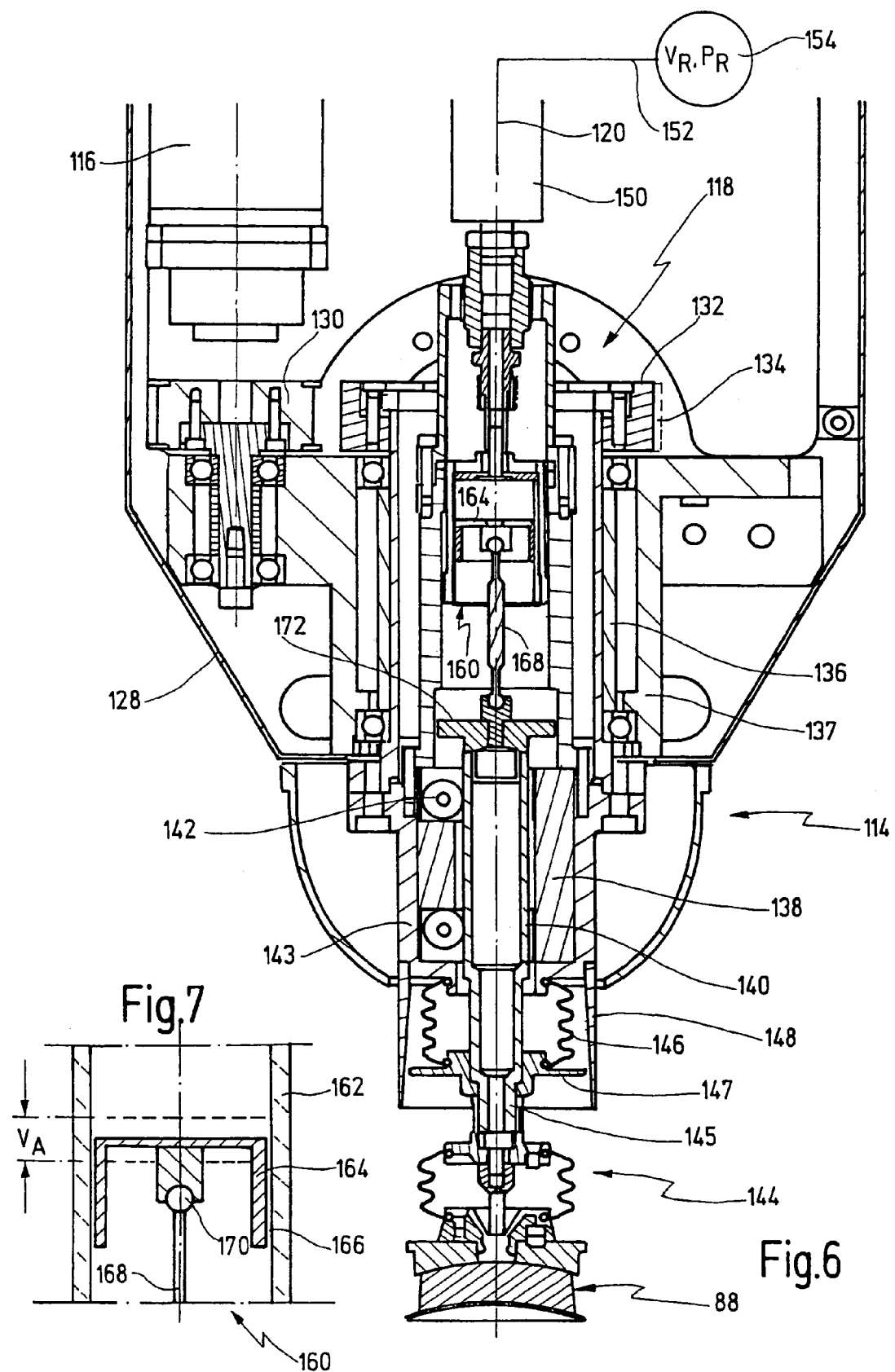

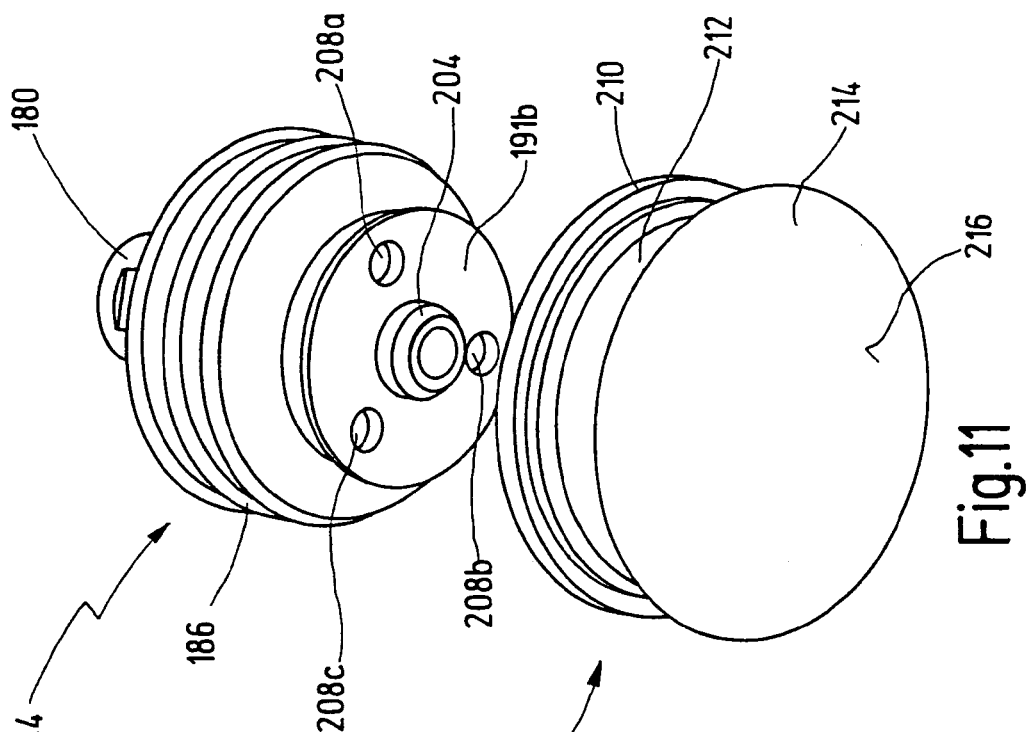
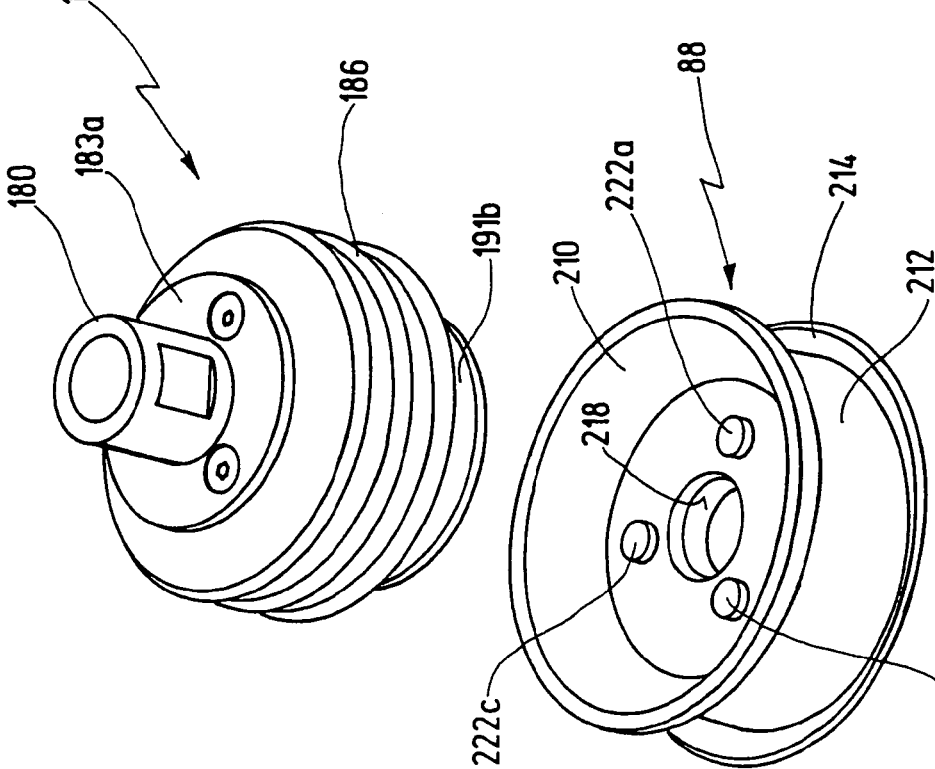

METHOD AND APPARATUS FOR PRODUCING OPTICAL GLASSES

CROSS REFERENCE TO OTHER APPLICATIONS

The present application is a divisional of U.S. application Ser. No. 11/113,451, filed Apr. 22, 2005, which is a continuation of pending International patent application PCT/EP2003/11827, filed Oct. 24, 2003 now U.S. Pat. No. 7,153,184 which designates the United States and was published in German, and which claims priority of German patent application 102 50 856.9, filed Oct. 25, 2002. The disclosure of the above application is incorporated herein by reference.

BACKGROUND OF THE INVENTION

The invention is related to a method for producing optical glasses, in which the glasses are polished and marked following a shaping processing.

The invention, further, is related to an apparatus for producing optical glasses, in which the glasses are polished and marked following a shaping process.

A method and an apparatus of the type specified before are known from WO 01/66308 A1.

The invention will hereinafter be described with regard to an application for spectacle lenses. However, it goes without saying that the invention may also be applied for other optical glasses.

It is well known that so-called single-vision spectacle lenses are defined by two spherical surfaces or by one spherical and one toroidal surface. For optimizing the central thickness and the peripheral thickness of single-vision spectacle lenses, a rotational symmetric aspherical function may be superimposed to the spherical or to the toroidal surface on one of the two sides of the lens.

In contrast, so-called progressive power lenses or multifocal lenses have at least one optical free-form surface computed by optimization software. The free-form surface is not rotationally symmetrical. Conventionally, it is located on the front surface of the spectacle lens. The so-called prescription surface, in contrast, is located on the toroidal rear surface of the spectacle lens and is adjusted to the optical characteristics of the spectacle user.

Plastic material progressive power lenses are produced by molding. With this type of production, the optical free-form surface is generated already during the forming process. Spectacle lenses made from silicate, in contrast, are produced by an iterative sequence of processing steps of grinding and of polishing.

The toroidal prescription processing is executed by grinding and polishing machines as are well known in the prior art.

The prior art, further, comprises spectacle lenses, the optical characteristics of which are individually computed and optimised for any spectacle lens. Such prior art spectacle lenses, therefore, have at least one individually computed optical surface in a spline representation. The production of such individual optical surfaces is conventionally executed for non-rotationally symmetrical plastic material spectacle lenses by means of diamond lathing techniques. Such lathes are known from WO 97/13603 as well as from EP 0 758 571 B1. These prior art diamond lathes operate with an automatic feeding of the spectacle lenses in connection with a conveyor belt. The spectacle lenses are affixed to blocks and are transported in ordering boxes.

When plastic material progressive power lenses are processed on their surface by means of a diamond lathing technology, they show a regular surface groove structure after the completion of the lathing process. This structure is of the order of 80 to 200 nm rms surface roughness. For obtaining the necessary final roughness of less than 10 nm rms, these lathed optical surfaces must still be polished. Finally, a so-called signature has to be applied. The signature or labelling is understood to be a marking for product identification on the one hand. On the other hand the application of two markings on each spectacle lens may define the optical axis, thereby assisting the optometrist to fit a lens into the spectacle frame in their correct position.

As chips are generated during the polishing process, the polished surfaces must be cleaned from the chips and from the polishing agent and must be dried thereafter, prior to the subsequent marking step.

A polishing machine, as may be used in the above-described context, is described in WO 01/56740 A1.

In practice, for polishing lathed or ground free-form surfaces, polishing tools are used, in which a polishing surface is configured as a disposable polishing coating. The polishing surface is supported by an elastic foam structure such that the polishing surface may adapt itself to the shape of the spectacle lens. The polishing surface is shaped either convex or concave, depending on whether concave or convex spectacle lens surfaces shall be polished.

After each polishing process the worn disposable polishing coating is detached from the polishing tool and is replaced by a fresh polishing coating. Following the detachment of the worn polishing coating the polishing tool is cleaned and dried.

During the subsequent marking of the spectacle lenses the above-mentioned marking is conventionally applied into the spectacle lens surface pointwise, i.e. as a dot pattern, by means of a laser beam.

All of the afore-described prior art apparatuses for polishing, washing and marking have in common that the spectacle lenses are fed individually, mostly manually.

WO 02/00392 A1 describes an apparatus for loading and for unloading optical work pieces. This prior art apparatus is preferably used in connection with a grinding machine for optical single lenses. In this prior art apparatus, the spectacle lenses are handled by means of a suction head being applied to the optical surface of the spectacle lenses. Although it is likewise suggested to use a pneumatically operated three finger gripper, the latter shall, however, only be used for centering the spectacle lenses.

U.S. Pat. No. 6,247,999 B1 discloses a method of automatically exchanging polishing tools. In this prior art method a plurality of polishing tools is placed ready in a row on a magazine bank. A robot picks up one of the polishing tools and attaches same to a gimballed suspension for the polishing tool at the drive element of the polishing machine. After completion of the polishing process the robot, together with the polishing tool moves into a device in which two metal sheets are arranged inclined with respect to the horizontal plane and enclose between them a gap. The robot enters the polishing tool into the gap and strips same off there. The worn polishing tool now falls downwardly into the inclined chute configured by the device and finally arrives at a container.

EP 0 567 894 A1 discloses an apparatus for guiding a work piece or a tool during the processing of toroidal or of spherical surfaces of optical lenses on grinding or polishing machines.

In this prior art apparatus a roller bellows is located at the lower free end of a spindle, the bellows supporting a polishing disk. An air pressure may be generated within a volume enclosed by the roller bellows, such that the polishing disk may be displaced axially. Moreover, the polishing disk is supported by an axially acting piston via a spherical joint. The roller bellows is adapted to transmit a torque for the polishing disk when rotated during operation.

This prior art apparatus has the disadvantage that the roller bellows is a relatively stiff element such that the polishing disk may effect its proper movements only to a very limited extent.

EP 0 974 423 A1 discloses another similar polishing disk, wherein the polishing tool may be attached to an actuator element via a bayonet joint.

This prior art apparatus has the disadvantage that for attaching the polishing tool, the latter must be oriented in an angularly correct orientation relative to the actuator element.

Another similar apparatus is disclosed in EP 0 974 422 A1.

BRIEF SUMMARY OF INVENTION

It is, therefore, an object underlying the present invention to further improve a method and an apparatus of the type specified at the outset such that the afore-mentioned problems are avoided.

In particular, it shall become possible to reduce the complexity of production as is necessary according to the prior art.

In a method, specified at the outset, this object is achieved in that the steps of polishing and of marking are executed within a common processing cell.

In an apparatus of the type specified at the outset, the object is achieved by an apparatus in which a polishing station, a washing station, and a marking station are arranged within one common processing cell.

The object underlying the invention is thus entirely solved.

The invention namely makes it possible for the first time to concentrate the entire production process for the prescription surface following the shaping process, which conventionally is executed by lathing or grinding, within one fully automated cell, such as to avoid the cumbersome manual work during loading and unloading of the spectacle glasses within the individual stations.

Obviously, substantial production costs may thus be saved.

In preferred embodiments of the invention the glasses are handled by the same robot during polishing and marking.

This measure has the advantage that for all actions within the processing cell only one handling element is required, such that production costs are also reduced insofar.

In a preferred embodiment of the inventive method it is particularly preferred when the robot a) takes the glasses from a conveyor belt,
b) feeds the glasses to a polishing station and deposits them there,
c) takes a polishing tool from a tool magazine,
d) processes the glasses by means of the polishing tool,
e) deposits the polishing tool,
f) takes the polished glasses from the polishing station, feeds them to a washing station and deposits them there,
g) picks up a washing tool,
h) washes the glasses in the washing station,
i) deposits the washing tool,
j) takes the washed glasses from the washing station and feeds them to a marking station, and
k) takes the marked glasses from the marking station and deposits them on the conveyor belt.

These measures have the advantage that by means of the one robot all handling actions, i.e. conveying actions between the various stations one the one hand as well as partly the processing steps, are assumed.

In this context it is further preferred when the robot, between the execution of steps k) and l), executes one or more of steps a) through i) on at least one other glass.

This measure has the advantage that the robot may operate on a time-multiplex basis, so that it may execute a handling on one glass while at the same time another glass is under processing otherwise, in particular within the marking station.

In another preferred embodiment of the invention the glasses are conveyed on the conveyor belt within transportation boxes.

This measure has the advantage that the glasses may be held at predetermined unloading and loading positions, wherein due to their arrangement in transportation boxes the handling may be executed under a defined orientation of the glasses.

Finally, it is particularly preferred when the robot holds the glasses by means of a gripper which grips the glasses at their periphery.

This measure has the advantage that the sensitive optical surface of the glasses remains untouched, in contrast to the prior art, so that any negative impact to these sensitive optical surfaces is made impossible.

The afore-mentioned variant of the inventive method may be still more refined in that the glasses are gripped with a predetermined force.

It is further preferred when the glasses are conveyed in pairs.

This measure has the advantage that those glasses belonging to a particular ordering person (patient) may be handled and conveyed together or directly one after another so that it may be excluded that they become mixed up.

It is further preferred when the glasses are arranged on a block for handling, i.e. for conveying and for processing.

This measure has the advantage that in particular during polishing the glass itself must not be gripped.

In a particularly preferred embodiment of the inventive method a polishing tool during polishing rests with a first surface on a second surface of the glass, wherein the first surface is smaller than the second surface, the surfaces, further, being rotated in the same direction and with essentially the same rotational speed, and wherein the first surface is guided over the second surface, in a radial direction. Insofar it is particularly preferred when an oscillating movement is superimposed on the radial movement in a direction perpendicular thereto.

In contrast to the prior art, where the polishing tool is guided over the surface of the glass to be ground along parallel, distant paths, this feature has the advantage that no optically distinguishable patterns are generated. Instead, a surface is generated in which the locus of the polishing surface is no more distinguishable for the human eye.

This holds true in particular, when the radial movement is guided along a diameter of the second surface.

In this context it is, further, preferred when the radial movement and the oscillating movement are adjusted with respect to each other such that the locus of the center of the first surface assumes the shape of a mirror-symmetric undulated line during the radial reciprocal movement.

In embodiments of the inventive apparatus one single robot is provided for handling the glasses between a conveyor, the polishing station, the washing station and the marking station, wherein the robot is preferably adapted for executing the polishing process, and, further, the robot is adapted for operating a polishing tool and the washing tool.

These measures have the advantage that all of the movement and processing actions are executed by one and the same robot. Insofar, it has turned out as particularly advantageous when the glasses during the respective processing (polishing and washing) are held by a stationary, however movable holding unit, whereas the robot holds and moves the respective required tool (polishing tool or washing tool).

In this context it is, further, preferred when the robot has a hand, wherein the hand by means of an axial actuator is adapted to be alternately brought into two operational positions, the hand having a gripper for gripping a glass and an interface for attaching a tool, the gripper in a first operational position being adapted for gripping and for depositing a glass, and in a second operational position for gripping and for depositing a tool.

This measure has the advantage that the door-to-door time within the processing cell may be further reduced because it is no more required to provide a special change step for the gripper or the tool holder at the hand of the robot.

In a preferred improvement of this embodiment the axial actuator is a rotary actuator.

This measure has the advantage that a particularly simple sequence of movements may be obtained in that, for example, the hand rotates by 180° respectively when in one instance a glass shall be handled and in another instance a tool shall be inserted.

In a preferred improvement of the inventive apparatus which may also be used alone, the robot has a gripper which grips the glasses at their periphery. In particular, this is effected with a predetermined force, wherein, further a force controller is preferably provided.

These measures have the already mentioned advantage that the sensitive optical surface of the spectacle lens does not need to be touched during the gripping of the glasses.

In this context it is particularly preferred when the gripper has three or more fingers arranged essentially parallel to each other and being adapted to be brought into engagement with the periphery of a glass.

This measure has the advantage that according to the number and the positioning of the fingers a gripping function as well as a centering function may be executed, and that the number and type of fingers may be optimised, depending on whether the glasses to be handled have a circular or an elliptical periphery or are shaped generally otherwise.

According to another preferred variant of this embodiment the fingers are provided with a soft envelope at their periphery.

This measure has the advantage that a damage to the periphery of the glasses is avoided even when relatively high gripping forces are used.

In another preferred embodiment of the invention that may likewise be used alone, for polishing a first surface of a glass a polishing tool is provided which, one the one hand is tangentially guided with a second, rotating surface over the first surface, and, on the other hand, for compensating different elevations within the first surface is fed-in in a direction perpendicular to the first surface. Thereby, an element for generating the rotation and/or for feeding-in is configured hollow.

This measure has the advantage that the masses which have to be moved during the polishing process, may be kept very small. When doing so, inertia is reduced and the polishing surface may particularly easily follow the surface of the glass to be polished, wherein only minimum forces have to be executed.

Insofar it is particularly preferred when the element is a tube.

This measure has the advantage that a very simple and low-cost element may be used.

In a preferred improvement of this embodiment the tube is a polygonal tube being radially journalled by means of roller bearings.

This measure has the advantage that the tube in its axial feeding direction is journalled almost free of friction because roller bearings prevent a radial movement of the polygonal tube at lowest possible friction.

In a further preferred way the tube transmits a torque from a rotational drive to the polishing tool.

For that purpose the tube may be configured as a polygonal tube, as already mentioned, or may be configured as a non-circular tube or as a tube having a spline tooth or the like.

In another improvement of this embodiment the element is connected to a linear displacement unit by means of a spherically journalled, non torque-transmitting transmission element.

This measure has the advantage that the axial feeding-in movement of the polishing tool may be executed independently from the transmission of torque for the rotational movement of the polishing tool. The elements required for the axial displacement are, therefore, decoupled from the transmission of torque and can be configured with low friction.

Preferably, the linear displacement unit is configured as a piston-cylinder unit.

This measure has the advantage that proven positioning and control elements can be used.

In this context it is further preferred when the transmission element is a coupling rod being preferably journalled spherically at both ends.

These measures have the advantage that the already mentioned no torque transmitting connection may be established, wherein the spherical joint, further, prevents that the piston becomes jammed within the cylinder as a consequence of an oblique position of the surface to be polished.

In a further preferred embodiment of the invention which may also be used alone, for polishing a first surface of a glass a polishing tool is provided which, one the one hand is tangentially guided with a second, rotating surface over the first surface, and, on the other hand, for compensating different elevations within the first surface is fed-in in a direction perpendicular to the first surface, wherein for feeding-in the second surface a piston-cylinder unit is provided, the piston-cylinder unit comprising a piston air-mounted within a cylinder.

This measure has the advantage that a particularly low friction arrangement is obtained because the piston is guided within the cylinder via an air bearing. As a consequence the contact force of the polishing tool, i.e. the polishing force, may be set particularly sensibly.

In this context it is particularly preferred when the cylinder is a glass cylinder, and that the piston is a graphite piston.

This measure has the advantage that an optimum frictional matching is obtained which may be operated over wide temperature ranges.

Further, a particularly good result is obtained in this context when the piston-cylinder unit is connected to a working reservoir containing compressed air and having a first predetermined volume, the piston defining a second predetermined volume within the cylinder between its extreme operational positions, the first volume being much bigger than the second volume, preferably at least 100 times, in particular at least 1,000 times as big as the second volume, and, mostly preferred, when the first volume is about 1 cm$^3$ and the second volume is about 3,000 cm$^3$.

This measure has the advantage that the system operates extremely linearly over the entire working stroke of the piston because the change in volume within the working cylinder is significantly smaller as compared to the volume within the pressure reservoir.

In another preferred embodiment of the invention which may also be used alone, for polishing a first surface of a glass a polishing tool is provided which, one the one hand is tangentially guided with a second, rotating surface over the first surface, and, on the other hand, for compensating different elevations within the first surface is fed-in in a direction perpendicular to the first surface, wherein for executing the feeding-in movement a transmission element is provided, the transmission element being linearly moved relative to a housing and protruding with a section from an end of the housing in an oscillating manner, a first bellows being arranged between the end and the section.

This measure has the advantage that the transmission element, moved in oscillation, is best protected against the intrusion of dirt. This is of particular advantage for the present application because during the polishing of the surface of the glass a substantial soiling occurs such that the guiding of the oscillating transmission element could eventually become clogged with the wear of the polishing tools.

In a particularly preferred practical example of this embodiment the section carries an annular flange, the first bellows connecting the flange with the end.

This measure has the advantage that a particularly simple and mechanically reliable setup is obtained.

In another preferred embodiment of the invention which may likewise be used alone, for polishing a first surface of a glass a polishing tool is provided which, one the one hand is tangentially guided with a second, rotating surface over the first surface, and, on the other hand, for compensating different elevations within the first surface is fed-in in a direction perpendicular to the first surface, wherein for executing the feeding-in movement a transmission element is provided, the transmission element being linearly moved relative to a housing and protruding with a section from an end of the housing in an oscillating manner, the section being surrounded by a protective sleeve being connected to the housing.

This measure has the advantage that an unintended damage to the oscillating protruding section of the transmission element is definitely prevented.

If, in a preferred improvement of this embodiment the protective sleeve surrounds the first bellows, this protection function extends also to the first bellows.

In still another embodiment of the invention that may likewise be used alone, for polishing a first surface of a glass a polishing tool is provided which, one the one hand is tangentially guided with a second, rotating surface over the first surface, and, on the other hand, for compensating different elevations within the first surface is fed-in in a direction perpendicular to the first surface, wherein the polishing tool is pivotably journalled in a transmission element, the transmission element being movable in the feeding-in direction along an axis, a tumbling disk being provided, the tumbling disk being connected with the transmission element via a spherical joint, and the tumbling disk being adapted to be coupled to the polishing tool.

This measure has the advantage that the spherically journalled tumbling disk enables in a particularly perfect manner to follow the different elevation of the surface to be polished of the glass. This holds true in particular in comparison to the gimballed suspensions of the prior art (U.S. Pat. No. 5,247,999) and, in particular, a bearing by means of a roller bellows (EP 0 567 894 A1), but also in comparison to a spherical Allen joint (WO 01/56740 A1, DE 101 00 860 A1).

In connection with the afore-described embodiment of the invention it is preferred when the transmission element has a ball head as a terminal end, the polishing tool being provided with a ball socket, the polishing tool being elastically held on the transmission element, wherein the ball head is elastically held in the ball socket, such that the polishing tool can execute a tumbling movement relative to the transmission element.

This measure has the advantage that, one the one hand, a tumbling movement of the polishing tool is possible and, on the other hand, by means of the elastic support the necessary torque can be transmitted to the polishing tool, while at the same time the spherical joint is held altogether with the necessary bearing force.

In a preferred improvement of this embodiment, the transmission element has a finger as an axial terminal end, the ball head being arranged at a free end of the finger.

This measure has the advantage that due to the cantilevered arrangement of the spherical joint consisting of the ball head and the ball socket a tumbling movement with a particularly large amplitude is enabled.

Further, in this embodiment it is preferred when for elastically holding the polishing tool a second, torque-transmitting bellows is arranged between the transmission element and the polishing tool.

This measure, on the one hand, has the advantage that the spherical joint in the above-described manner is also reliably protected against soiling as occurs during the polishing process; on the other hand, the elastic support and, thereby, the transmission of torque as well as the holding force within the spherical joint may be guaranteed with a particularly simple and low cost element, namely a bellows.

This holds true in a preferred manner if the second bellows surrounds the finger.

Finally it is preferred in this context if the ball socket is configured conical.

This measure has the advantage that there only exists a very small contact surface between the ball head and the ball socket, ideally just a contact line, such that the joint has only a very low friction.

In a preferred embodiment of the invention which may also be used alone, for polishing a first surface of a glass a polishing tool is provided, the polishing tool being coupled to a drive via a magnetic clutch.

This measure has the advantage that no mechanical clutch has to be opened or closed for connecting the polishing tool with its drive. Instead, the magnetic clutch may be opened and closed in a simple manner. This may be done either electrically, or by separating the magnetically coupled elements from each other through the application of a pulling force.

In a preferred improvement of this embodiment the magnetic clutch is provided with permanent magnets.

This measure has the advantage that the clutch is operated without current. The permanent magnets may either be used as a pair of permanent magnets or as a permanent magnet together with a corresponding piece of soft iron.

In this embodiment an example is further preferred in which the polishing tool, on the one hand, is tangentially guided with a second, rotating surface over the first surface, and, on the other hand, for compensating different elevations within the first surface is fed-in in a direction perpendicular to the first surface, wherein the polishing tool is pivotably journalled in a transmission element, the transmission element being movable in the feeding-in direction along an axis, a tumbling disk being provided, the tumbling disk being connected with the transmission element via a spherical joint, and the tumbling disk being adapted to be coupled to the polishing tool via a magnetic clutch.

This measure has the advantage that in a practical embodiment the polishing tool may, in a most simple manner, be coupled to and decoupled from its corresponding drive unit, namely the tumbling disk, such that the polishing tool needs only to consist of a polishing disk and a polishing coating.

Also in the afore-mentioned case it is preferred when the transmission element has a ball head as a terminal end, the polishing tool being provided with a ball socket, and the polishing tool being elastically held on the transmission element, wherein the ball head is elastically held in the ball socket, such that the polishing tool can execute a tumbling movement relative to the transmission element.

In another group of embodiments of the invention that may likewise be used alone, a tool magazine is provided, a plurality of polishing tools being deposited in the tool magazine, the tool magazine being located within the operational area of a robot.

This measure has the advantage that the tool change, in particular the polishing tool change, may be automated. In particular, a worn polishing tool may be exchanged against a fresh polishing tool. Further, it is possible for the subsequent processing of glasses of different size to change polishing tools in different sizes one after the other.

In a preferred manner the tool magazine is configured with a plurality of chutes, the polishing tools being sorted and stored in the chutes according to the radii of their polishing surface.

Further, it is preferred when the chutes are inclined relative to a horizontal plane, and when slideways for the polishing tools are provided.

This measure has the advantage that the tools move up sliding in the chutes as soon as a tool is withdrawn at the lower end such that a new tool is automatically placed ready every time at a pickup position without the necessity of separate conveyor installations.

In that case it is preferred when stops are provided at the lower end of the slideways.

Further advantages of the invention will become apparent from the description and the appended drawing.

It goes without saying that the features mentioned above and those that will be explained hereinafter may not only be used in the particularly given combination, but also in other combinations, or alone, without leaving the scope of the present invention.

BRIEF DESCRIPTION OF THE DRAWINGS

Embodiments of the invention are shown in the drawing and will be explained in the subsequent description.

FIG. 6 on a further enlarged scale shows a portion of the hand of FIG. 5 for explaining further details;

FIG. 7 on a further enlarged scale shows a detail from FIG. 6 depicting an air cylinder;

FIGS. 10 and 11 show two perspective views of the elements tumbling disk and polishing tool depicted in FIGS. 8 and 9;

DETAILED DESCRIPTION OF THE EMBODIMENTS

Figures 1, 2:
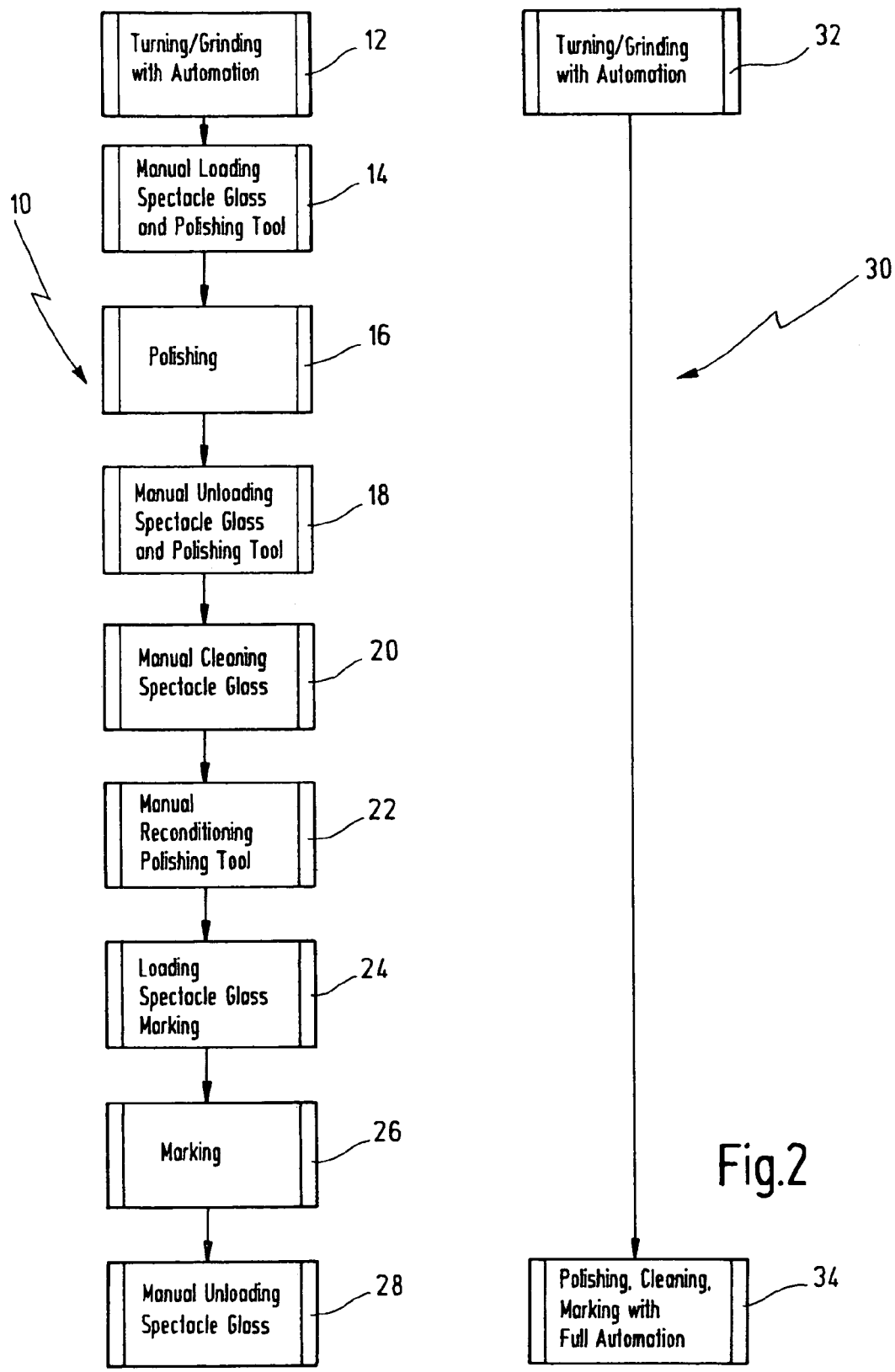
FIG. 1 shows a flow chart for explaining a method for producing optical glasses according to the prior art.
FIG. 2 shows a flow chart, similar to FIG. 1, however, for an embodiment of a method according to the present invention.

In FIG. 1 reference numeral 10 as a whole indicates a flow chart for explaining a working process according to the prior art. After the lathing or the grinding of a spectacle lens (block 12) the spectacle lens as well as a polishing tool are manually fed to a polishing machine (block 14). The polishing machine then executes the polishing process (block 16). The polished spectacle lens is then unloaded and the polishing tool is removed (block 18).

The spectacle lens must now be cleaned manually or by means of a special washing device (block 20), and the polishing tool and/or the washing tool must be reprocessed manually or by means of a special device (block 22). The spectacle lens is then manually fed to a marking station (block 24) and marked therein (block 26). Only then the spectacle lens may be unloaded by hand (block 28) and may be transported away.

From the preceding description it becomes apparent that the conventional processes require a substantial amount of time because a large number of manual steps have to be executed which costs time on the one hand and may be a source of faults, on the other hand.

Figure 3:
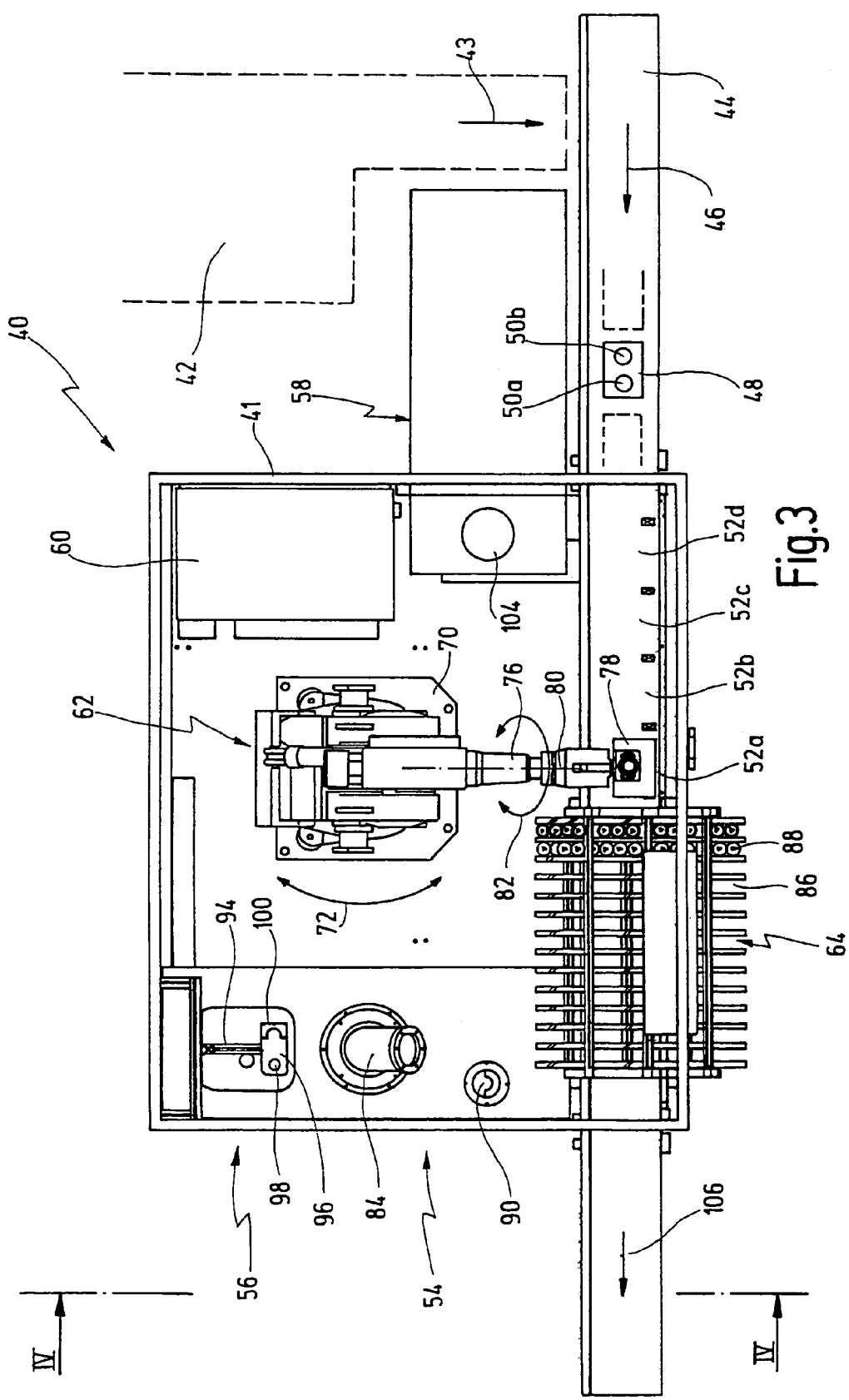
FIG. 3 shows a highly schematic top plan view of an embodiment of an apparatus according to the present invention.
Figure 4:
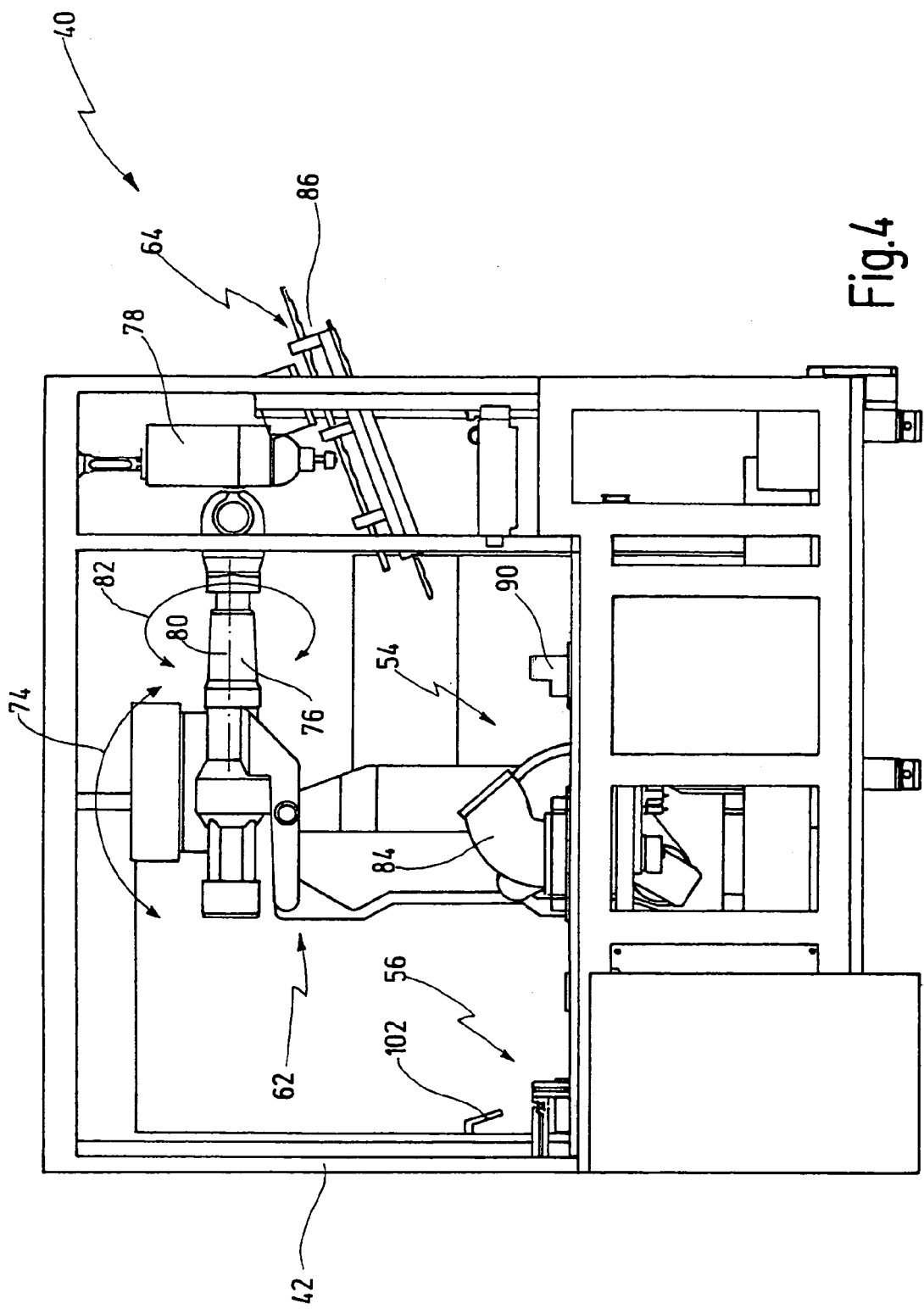
FIG. 4 shows a side elevational view along line IV-IV in FIG. 3.

In contrast thereto, FIG. 2 shows a block diagram 30 which, in a conventional manner, follows the automatic shaping process of the spectacle lens by lathing or grinding (block 32), whereas thereafter all subsequent steps of polishing, cleaning and marking are executed fully automatically (block 34), without the necessity of manual intervention. This shall be described hereinafter:

In FIGS. 3 and 4 reference numeral 40 designates a processing cell having a housing frame 41. The processes of polishing, washing and marking are executed fully automatically within processing cell 40.

The lenses are fed from a conventional lathing or grinding machine 42 to a conveyor belt 44 in the direction of an arrow 43, where they are transported to processing cell 40 along a conveyor direction indicated by an arrow 46.

Transportation boxes 48 are used for transportation on conveyor belt 44. Each of transportation boxes 48 receives one pair of lenses 50a, 50b, being each allotted to a particular patient or customer. As will be explained further below (FIG. 12), lenses 50 are arranged on a block 51, as known per se, so that they may be easier held and moved (rotated) during processing.

In the embodiment shown, four handling positions 52a, 52b, 52c and 52d are indicated on conveyor belt 44 within processing cell 40. At these handling positions 52a through 52d, one transportation box 48 may be stopped at one time. This makes it possible to place lenses 50 ready in a predetermined position, so that lenses 50 from different transportation boxes 48 may be processed in parallel within different stations of processing cell 40.

Processing cell 40 comprises a polishing station 54, a washing station 56, a marking station 58 as well as a central control unit 60. A robot 62 is provided within processing cell 40 as a central work unit. Robot 62 cooperates with a tool magazine 64.

Robot 60 is standing on a base 70. Various possible movements of robot 60 are indicated by arrows 72 and 74. In a preferred embodiment of the invention, robot 62 is a six-axis-robot.

Robot 62 is provided with an arm 76 having a hand 78 at a free end thereof. Hand 78 is adapted to be rotated about an axis 80 extending along arm 76, as indicated with another arrow 82.

Processing cell 40 operates as follows:

At the beginning of a processing operation robot 62 is actuated such that a gripper arranged on arm 78 takes a lens 50 out of a transportation box 48. Details of the gripper will be explained further below with regard to FIGS. 5 and 12 through 17.

Robot 62 now transfers lens 50 to a polishing spindle 84 within polishing station 54. Lens 50 with its block 51 is inserted into a socket of polishing spindle 84, such that lens 50 may be rotated.

After depositing lens 50 within polishing spindle 84, robot 62 drives hand 78 to tool magazine 64. There, polishing tools 88 are stored in chutes 86. For example, polishing tools 88 of different size may be sorted in different chutes 86. Further details of tool magazine 64 will be explained further below with regard to FIGS. 18 through 20.

As polishing tools 88 are wearing parts requiring to be reprocessed after a polishing process, it is necessary to keep available a sufficient large number of polishing tools 88 within tool magazine 64, for example as many polishing tools as are needed for a one day production.

For receiving polishing tool 88, hand 78 of robot 62 is rotated about axis 80 so that the respective polishing tool 88 may be received. Details thereof will be explained further below with regard to FIGS. 5 through 11.

Robot 62 with polishing tool 88 arranged at hand 78 now returns to polishing station 84 and moves into a collar surrounding polishing spindle 88 until polishing tool 88 with its polishing surface comes into contact with the surface of lens 50 to be polished. Details of the polishing process will be described further below, in particular with regard to FIG. 21.

As soon as the polishing process is completed, hand 78 with polishing tool 88 moves out of polishing spindle 84. Polishing tool 88 is now transferred to a dumping magazine 90. Here, polishing tool 88 is stripped from hand 78 by driving polishing tool 88 forward behind a cut-back stop and by then retracting hand 78 back from polishing tool 88. Polishing tool 88 then falls into a container within dumping magazine 90 filled with a cleaning fluid.

Robot 62 now returns with hand 78 to polishing station 54 and takes lens 50 having been polished but being soiled due to the preceding polishing process. It now transfers same to washing station 56, namely into a holder 94 being located there.

Robot 62 now separates with its hand 78 from lens 50 an picks up a sponge 98 arranged in a trough 96 of washing station 56 for cleaning polished lens 50 thereafter. For that purpose lens 50 may remain secured stationarily or may be moved within holder 94.

After the completion of the washing process sponge 98 is again deposited in a deposition unit 100 of trough 96. Again, this may be effected by means of a cut-back stop and a stripping movement of the hand.

For supporting the washing process a plurality of jets is provided, one of which being indicated at 102 in FIG. 4. A washing fluid, for example water, and subsequently a drying medium, for example compressed air, may be fed via jets 102.

After having deposited sponge 98 robot 62 with its hand 78 again moves to lens 50 having now been washed an dried and takes it from holder 94. Robot 62 now transfers lens 50 to a marking holder 104 within marking station 58. Lens 50 is marked there, for example by means of a laser, i.e. is provided with a certain product number, but may also be provided with marks on the optical surface allowing the optometrist at a later stage to exactly fit the spectacle lens into a spectacle frame.

While within the polishing station as well as within the washing station, robot 62 actively participated in the processing steps of polishing and of washing executed therein, such activity is not required within marking station 58 because lens 50 was only deposited in marking holder 104, whereas the marking itself is executed automatically and without the involvement of robot 62.

Considering that the marking process on the other hand side requires some time, robot 62, in a preferred improvement of the invention, may already take the subsequent lens 50 from its transportation box 48 during that time and may execute the afore-described steps of polishing and of washing thereon. It may also be possible to likewise handle and process the next but one lens accordingly, until the marking on the first lens is completed whereupon it may be taken away from the marking holder by robot 62 and be laid back into its transportation box 48.

Transportation boxes 48 with the completely processed lenses 50 now leave processing cell 40 on conveyor band 44 in the direction of arrow 106 indicated in FIG. 3.

FIGS. 5 through 17 show further details of elements arranged on hand 78.

Figure 5:
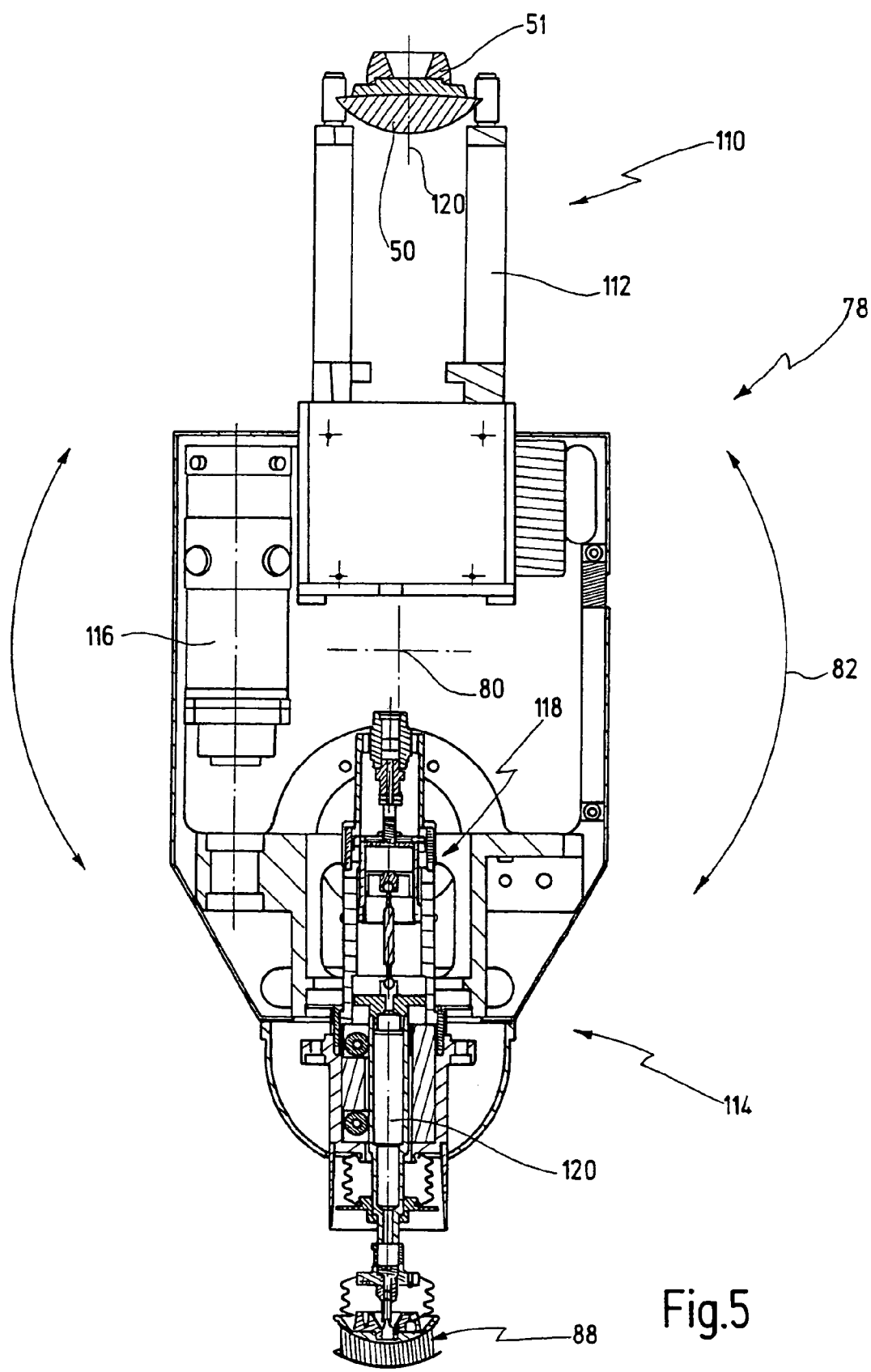
FIG. 5 on a highly enlarged scale shows a side elevational view, partially cut away, of a hand of a robot, as may be used in an apparatus according to FIGS. 3 and 4.

FIG. 5 in a side elevational view shows the axis 80 of arm 76 extending perpendicular to FIG. 6 as well as the pivotal movement of hand 78 by, preferably 180° each, indicated with arrow 82. At this point it should be self-understanding that hand 78 may also be provided with a larger number of units at respective smaller angular increments.

In the illustration of FIG. 5 a gripper 110 with a plurality of fingers 112 is arranged at the upper end of hand 78. At the lower end of hand 78 a polishing head 114 together with a rotational drive 116 for polishing tool 88 as well as a piston-cylinder unit 118 for an axial displacement of polishing tool 88 along a longitudinal axis 120 are provided.

Also at this point it goes without saying that the elements shown are to be understood only schematically and that of course other types of rotary drives or of linear drives may likewise be used.

FIG. 6, on an enlarged scale and with further details, shows the lower end of hand 78. This lower end is entirely surrounded by a housing 128.

Within housing 128 and below rotary drive 116 there is arranged a first pinion 130 driven thereby, connected with a second pinion 132 via a toothed belt 134, the second pinion 132 rotating about axis 120. Second pinion 132 drives a rotor 136 being journalled via a plurality of bearings within a seat 137 being stationary with the housing.

At its lower end rotor 136 is provided with a sleeve 138 in which a polygonal tube 140 is arranged non-rotatably but axially displaceable. Polygonal tube 140 is radially journalled within sleeve 138 via roller bearings 142. As a consequence, polygonal tube 140 rotates with sleeve 138, however, may axially move within sleeve 138 with almost no friction.

Rotor 136 terminates downwardly in a lower end 142 and configures a radial closure plane there. A tapering section 145 of polygonal tube 140 extends through the closure plane and protrudes outwardly. At the free end thereof a tumbling disk 144 is arranged, further details of which being explained below with regard to FIG. 8.

A first bellows 146 is attached with its upper rim to the lower end 143 of rotor 136 and with its lower rim to a flange 147 surrounding the lower portion of protruding section 145 of polygonal tube 140. Thereby it is effected that during an axial movement of section 145, within the opening defined by lower end 143, no dirt may enter from outside into the area of the polygonal tube 140, and, in particular, not into the area of roller bearings 142.

Finally, a surrounding protective sleeve 148 is arranged about first bellows 146.

Polygonal tube 140 may be displaced in the direction of axis 120 according to a predetermined force/displacement function. Piston-cylinder unit 118, already mentioned, is used for that purpose.

Piston-cylinder unit 118 is preferably operated pneumatically. For that purpose, a rotary compressed air junction 150 is provided at the upper end of piston-cylinder unit 118 allowing a compressed air supply to piston-cylinder unit 118 rotating during operation together with rotor 136. A duct 152 connects rotary joint 150 to a compressed air reservoir 154. In FIG. 6, the volume thereof is designated with $V_R$ and its operating pressure with $p_R$.

Piston-cylinder unit 118 is provided with a so-called air cylinder 160. As can particularly be seen from FIG. 7, air cylinder 160 is provided with a glass cylinder 162, within which runs a piston 164 with minimum air gap 166. An axial force-transmitting connection is established between piston 164 and an upper flange 172 of polygonal tube 140 via a coupling rod 168, the upper and the lower end of which being provided with a ball head, the upper end being designated 170 in FIG. 7.

In a practical embodiment piston 164 has a diameter of 16 mm and a stroke of 5 mm. The working volume of piston 164 between its extreme operational positions, designated $V_A$ in FIG. 7 is, therefore, about 1 cm³.

Volume $V_R$ of compressed air reservoir 154, in contrast, is about 3,000 cm³, such that the ratio of the volumina in that case is 3,000:1. The operational pressure $p_R$ is, for example, between 4 and 5 bar. Thereby, an operational force of piston 164 in the range of between 50 and 100 N is generated.

Cylinder 162, as already mentioned, preferably consists of glass. Piston 164 preferably consists of graphite, whereby an optimum frictional matching is generated, resulting in a minimum frictional coefficient over wide ranges of temperature. Due to the small air gap 166 an air bearing between piston 164 and cylinder 162 is configured, such that piston 164 runs within glass cylinder 162 with almost no friction.

By means of rotary drive 116 a rotary movement of rotor 136 at, for example 1,000 min⁻¹ is induced. In order to enable polishing tool 88 with the lower side of tumbling disk 144 to follow the change of elevation of lens 50 rotating at the same speed and, preferably, with the same direction of rotation, polishing tool 88 follows the rotating spectacle lens surface with a constant contact force at frequencies above 50 Hz.

The low friction of the elements responsible for the linear drive together with the small weight, in particular that of hollow polygonal tube 140, enables a precise position control at extremely small inertial forces.

Figure 8:
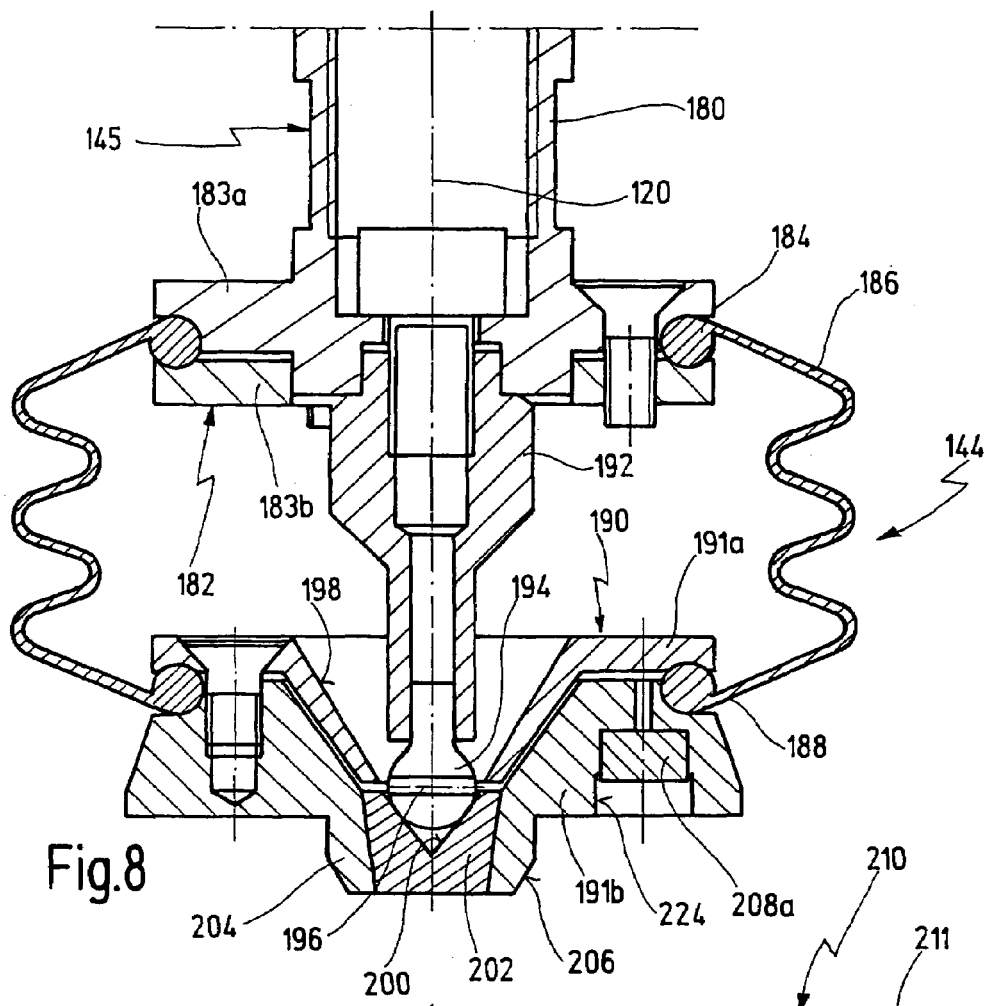
FIG. 8 on a further enlarged scale shows a detail illustration of FIG. 6, depicting a tumbling disk.

FIG. 8 shows further details of tumbling disk 144.

A lower end 180 of section 145 of polygonal tube 140 terminates in a first disk 182 which, as a clamping device, is provided with an upper plate 183a and a lower plate 183b which can be bolted together. An upper rim 184 of a second bellows 186 is clamped between these plates 183a, 183b, the second bellows 186, like first bellows 146, being arranged rotationally symmetrical about axis 120.

A lower rim 188 of second bellows 186 is held in a second disk 190 which is likewise configured as a clamping device with an upper plate 191a and a lower plate 191b.

Second bellows 186 surrounds a spherical joint. The spherical joint is configured, on the one hand, by an axial finger 192 extending downwardly as an extension of lower end 180, and having at its free end 180a ball head 194 with a center 196.

The counterpart of the spherical joint is configured by a conical opening 198 within upper plate 191a as well as a ball socket 200 within lower plate 191b. Ball socket 200, preferably, is configured as a cone within an insert 202 within lower plate 191b.

As can easily be seen from FIG. 8, second disk 190 may execute a tumbling movement relative to first disk 182, during which ball socket 200 is pivoted about ball head 194.

Second bellows 186, insofar, has three functions:

On the one hand, second bellows 186 is adapted to transmit a torque from polygonal tube 140 via the lower end 180 of the latter to second disk 190 to which polishing tool 88 is attached, as will still be explained.

On the other hand, second bellows 186 generates an axially directed pulling force, pulling second disk 190 elastically upwardly, such that ball head 194 is elastically held within ball socket 200. In such a way, second disk 190 may execute a tumbling movement relative to first disk 182 over a wide angular range.

Finally, second bellows 186 acts as a protection of the spherical joint against being soiled.

In order to be able to attach polishing tool 88 to tumbling disk 144 from below, the following measures have been taken:

First, on the lower side of second disk 190 a pin 204 is provided protruding along axis 120 and being provided with a taper 206 at its lower end. Second, the lower side of second disk 190 is provided with three permanent magnets 208a, 208b, and 208c, offset about 120° with respect to each other in a peripheral direction, as becomes particularly apparent from FIG. 11.

Figure 9:
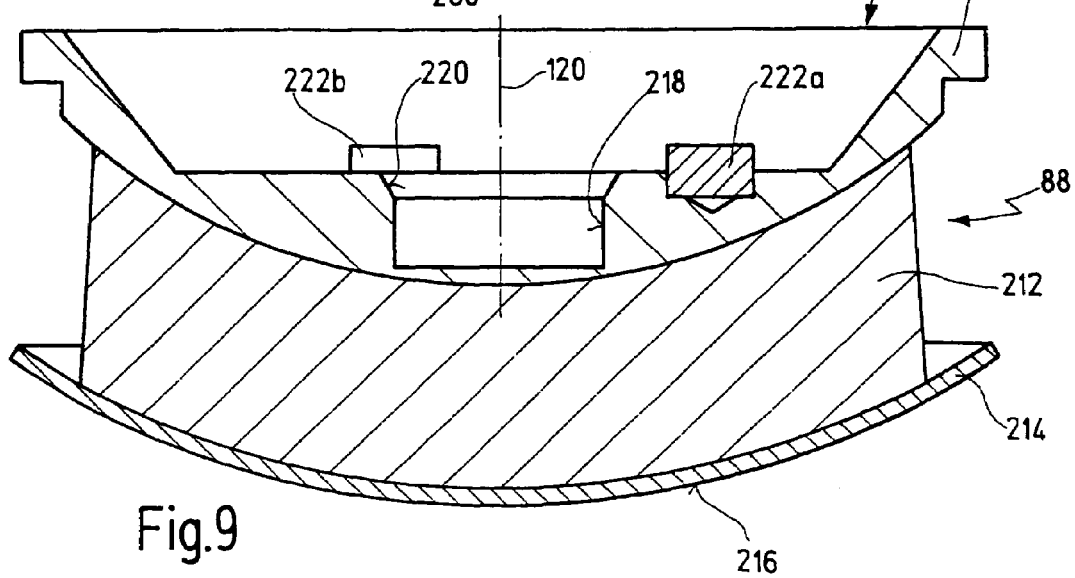
FIG. 9 on a further enlarged scale shows a detail from FIG. 6 depicting a polishing tool.
Figure 18:
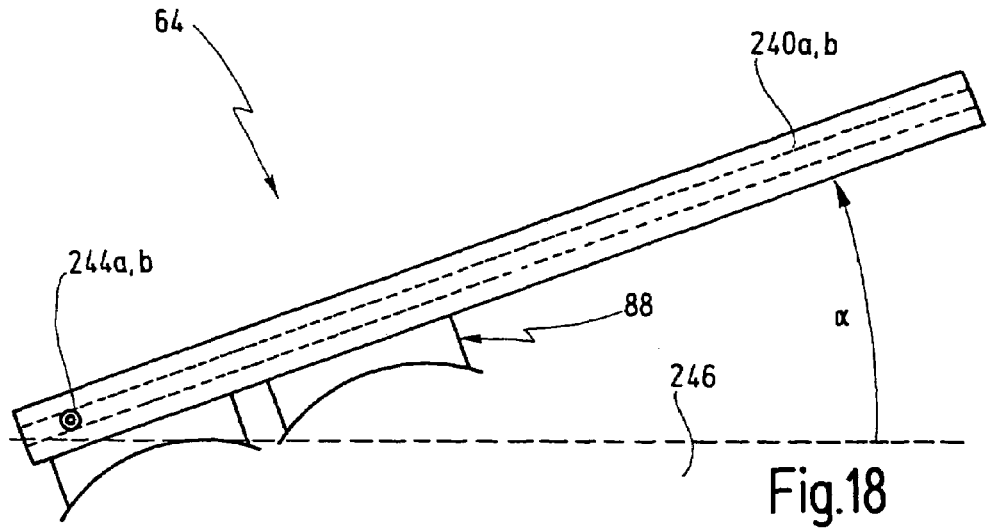
FIG. 18 shows a highly schematic side elevational view of a tool magazine as may be used with an apparatus according to FIGS. 3 and 4.
Figure 19:
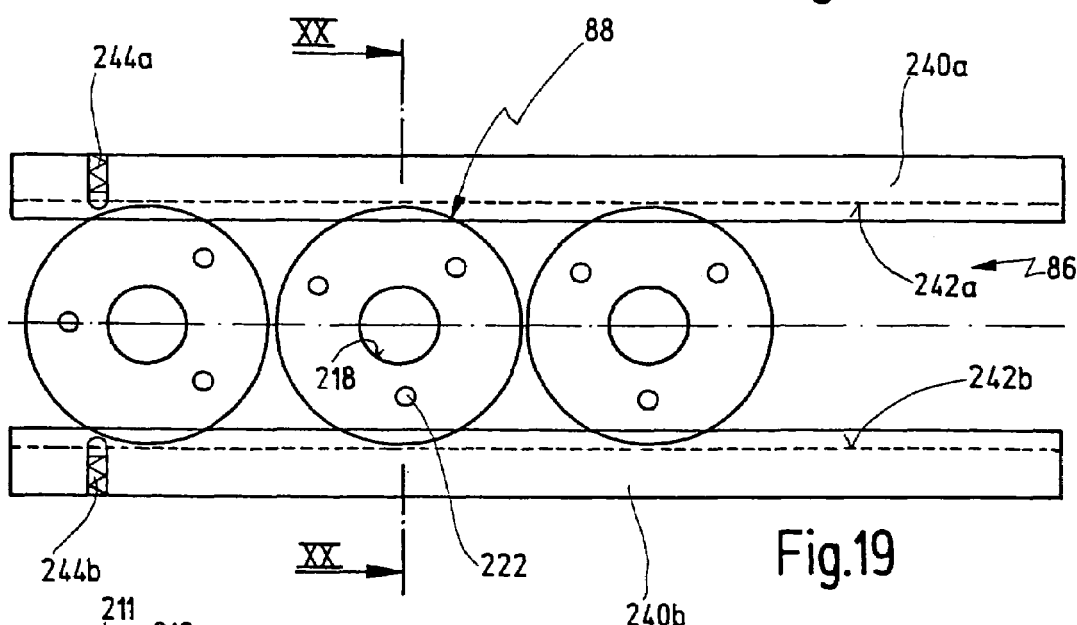
FIG. 19 shows a top plan view on the tool magazine according to FIG. 18.
Figure 20:
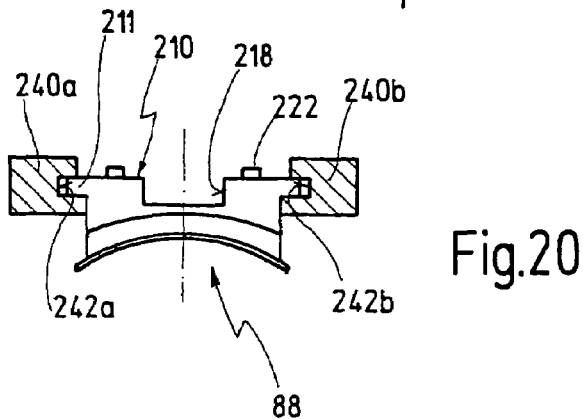
FIG. 20 shows a sectional view along line XX-XX of FIG. 19.

FIG. 9 shows that polishing tool 88 has a third disk 210 being provided with an annular flange 211 at its periphery, as will be discussed below in connection with the explanation of the tool magazine (FIGS. 18 through 20).

Below third disk 210 there is an elastic layer 212, preferably a soft sponge. The tool 214 as such is attached to the underside of layer 212 and is commonly referred to as polishing shell. The lower surface 216 thereof, constituting the polishing surface, is shaped convex in the embodiment shown in FIG. 9 in order to polish concave lens surfaces. Of course, surface 216 may also be shaped convex for processing concave lens surfaces.

A location hole 218 is located in the center of third disk 210, hole 218 being complementary to pin 204 of tumbling disk 144. In particular, hole 218 has an insertion taper at its upper end adapted to cooperate with taper 206 of pin 204.

Further, third plate 210 is likewise provided with three permanent magnets 222a, 222b, 222c spaced by 180° with respect to each other, as can most clearly be seen in FIG. 10.

As can be easily understood, polishing tool 88 may be simply connected with tumbling disk 144 by assembling axially the elements shown in FIGS. 8 and 9. Then pin 204 enters into hole 218 and magnets 208/222 attract each other and provide for the necessary holding force. In the illustrated embodiment, magnets 208/222, further, are configured as catches, such that there is also a torque-transmitting connection between tumbling disk 144 and polishing tool 88 because magnets 222 enter into bores 224 into which magnets 208 are inserted.

It should be clear at this point that permanent magnets 208, 222 are to be understood solely as examples. Electrically operated magnets or combinations of magnets and of soft iron parts could likewise be used with the same results.

Figure 12:
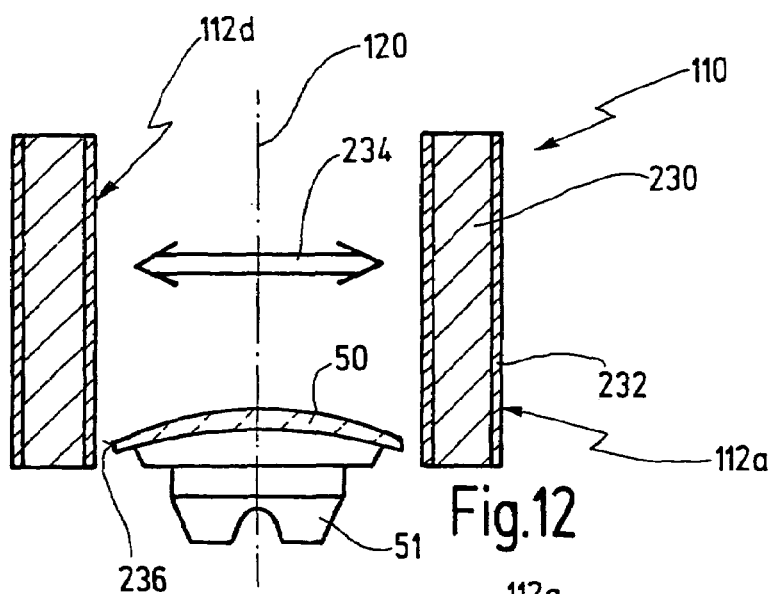
FIG. 12 shows a schematic side elevational view, partially cut away, of a gripper as may be used in the hand of the robot according to FIG. 5.
Figure 17:
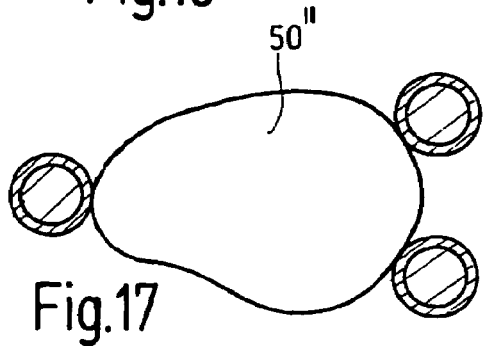

FIGS. 12 and 17 illustrate further details of gripper 110.

FIG. 12 shows that fingers 112 of gripper 110 consist of a core 230 and of an envelope 232, wherein core 230 is configured mechanically stable and hard, whereas envelope 232, preferably, is configured soft.

It is important for gripper 110 that fingers 112 grip lens 50 solely at its periphery 236, whereby, in contrast to the prior art, the optical surface of lens 50 remains untouched.

Figure 13:
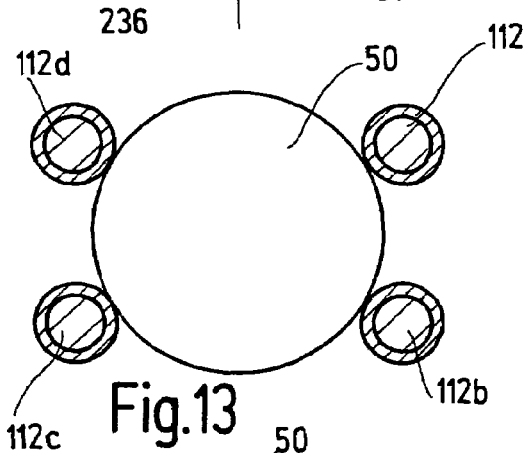
FIGS. 13 through 17 show schematic top plan views on the arrangement of FIG. 12, for five distinct embodiments.
Figure 14:
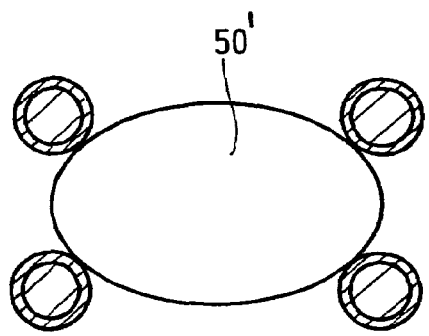

FIG. 13 shows a configuration in which a lens being circular in a top plan view is held by four fingers 112a through 112d which, according to FIG. 14 is also possible for a lens with an elliptical shape as seen from above.

Figure 15:
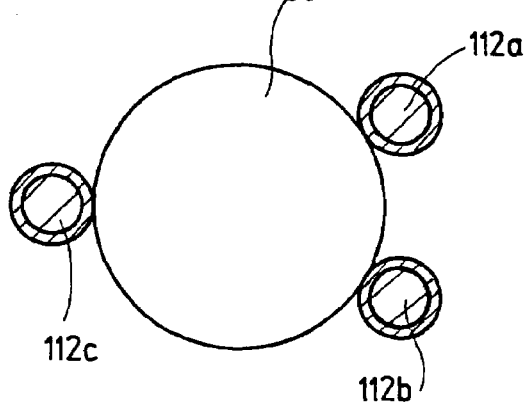
Figure 16:
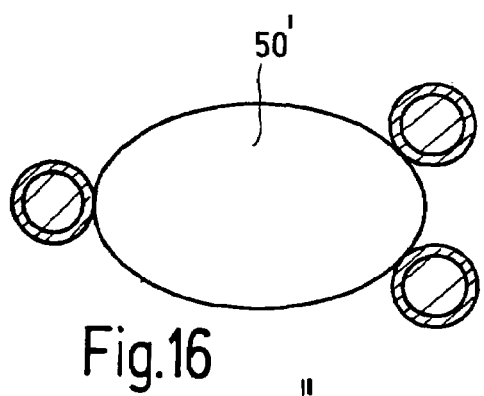

As illustrated by FIGS. 15 and 16, this is likewise possible if three fingers 112a through 112c are used.

Finally, FIG. 17 shows an irregularly shaped lens 50', as seen from above, which may also be held by three fingers.

FIGS. 18 through 20 illustrate further details of tool magazine 64.

Tool magazine 64 is provided with two parallel rails 240a, 240b for each chute 86. Rails 240a, 240b are each provided with longitudinally extending slide grooves 242a, 242b facing each other. At the left hand end of grooves 242a, 242b, as seen in FIGS. 18 and 19, spring-biased pins 244a, 244b are provided which, in their relaxed state extend into slide grooves 242a, 242b.

Rails 240a, 240b are arranged in an inclined orientation relative to a horizontal mount 246, as indicated in FIG. 18 by an angle α.

Polishing tools 88 are held within rails 240a, 240b, by letting above-mentioned annular flanges 211 of third disks 210 of polishing tools 88 run in slide grooves 242a, 242b (cf. FIG. 9). Under the action of gravity, polishing tools slide by themselves to the left hand end of rails 240a, 240b, as seen in FIG. 18. The respective lowermost polishing tool 88 is retained there by means of spring-biased pins 244a, 244b.

As can clearly be seen from FIGS. 8 and 9, second disk 190 at the lower end of tumbling disk 144 has a much smaller diameter as compared to third disk 210 at the upper side of polishing tool 88 which is also shown from above in FIG. 19. Robot 62, therefore, in the operational position of FIG. 5, may move with its hand 78 into the area of tool magazine 64 and insert second disk 190 into the gap between rails 240a and 240b until second disk 190 comes to rest on third disk 210, whereupon disks 190, 210 stick together under the action of magnets 208, 222. Robot 62 may now displace hand 78 in an axial direction of the respective chute 86, such that the respective foremost polishing tool overcomes the retaining force of spring-biased pins 244a, 244b and is pulled out of slide grooves 242a, 242b. Thereupon, under the action of gravity, the respective next polishing tool 88 moves up by sliding.

Figure 21:
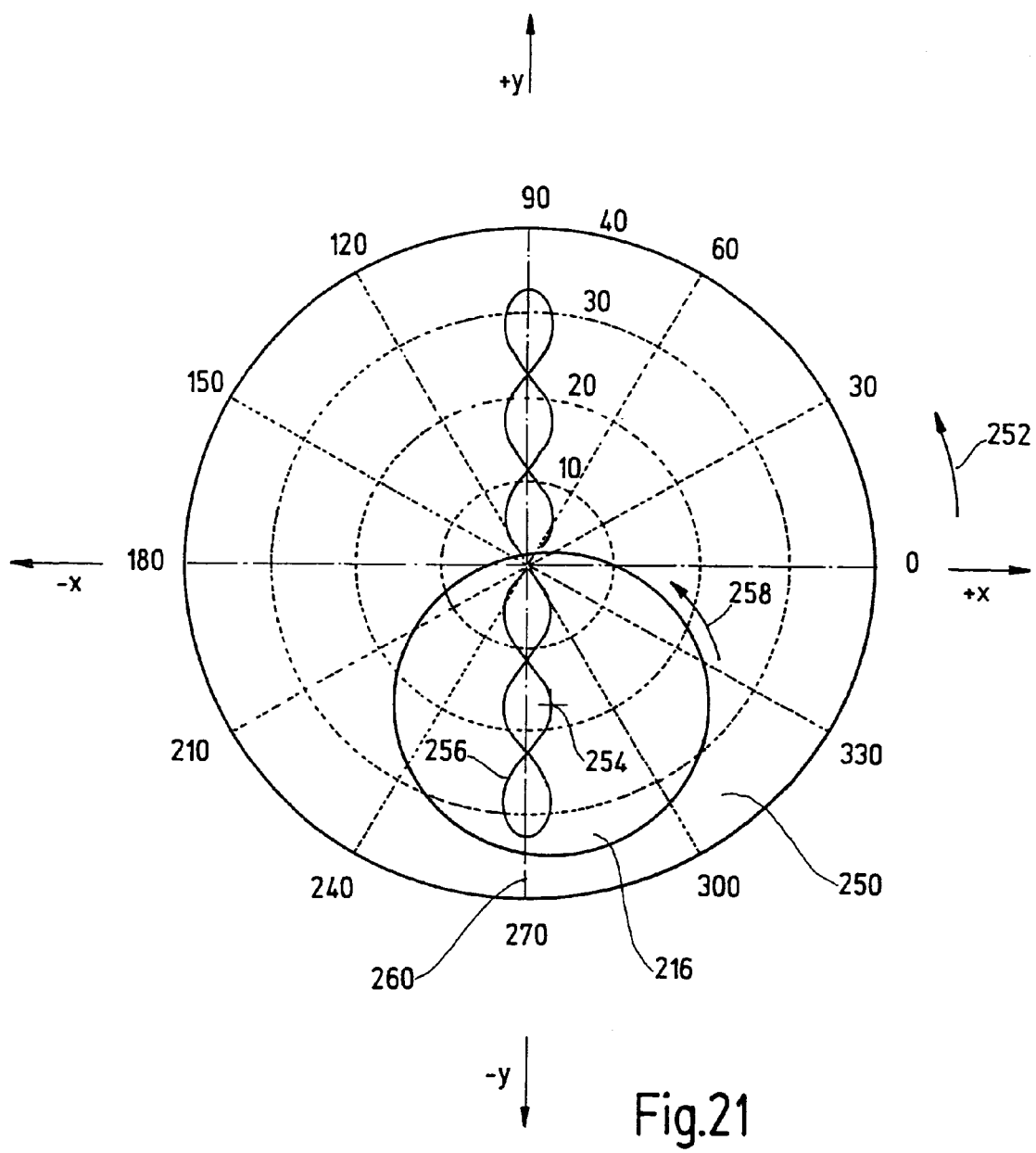
FIG. 21 on a highly enlarged scale shows a top plan view on a glass being processed according to the method of the present invention.

FIG. 21 shows a spectacle lens surface 250 in the manner of a polar coordinate system. The principal axes are designated x and y.

An arrow 252 indicates the direction or rotation of lens 50, and, hence, of surface 250 when lens 50 is positioned within polishing spindle 84 of polishing station 54.

In FIG. 21 surface 216 of polishing tool 88 is also shown as it rests on spectacle lens surface 250. The center of surface 216 is designated 254. Polishing surface 216 rotates in the same direction as spectacle lens surface 250 as indicated by an arrow 258. The rotational speeds are likewise essentially the same.

Reference numeral 256 in FIG. 21 indicates a locus of movement of center 254 of polishing surface 216 during the inventive polishing process.

As can clearly be seen, locus 256 is generated by the superimposition of two periodical movements. The first movement runs along a diameter 260 of spectacle lens surface 250, i.e. in the y-direction in the illustration of FIG. 21. A second movement is superimposed on, or simultaneously combined with, the first movement, wherein the second movement oscillates in the x-direction with small amplitude. The ratio between the frequencies of these movements in the y-direction and in the x-direction is 1:3 in the illustrated embodiment. Thus, the combined movements result in a mirror-symmetrical undulated line pattern 256 instead of the straight line pattern according to the prior art.

Figure 22:
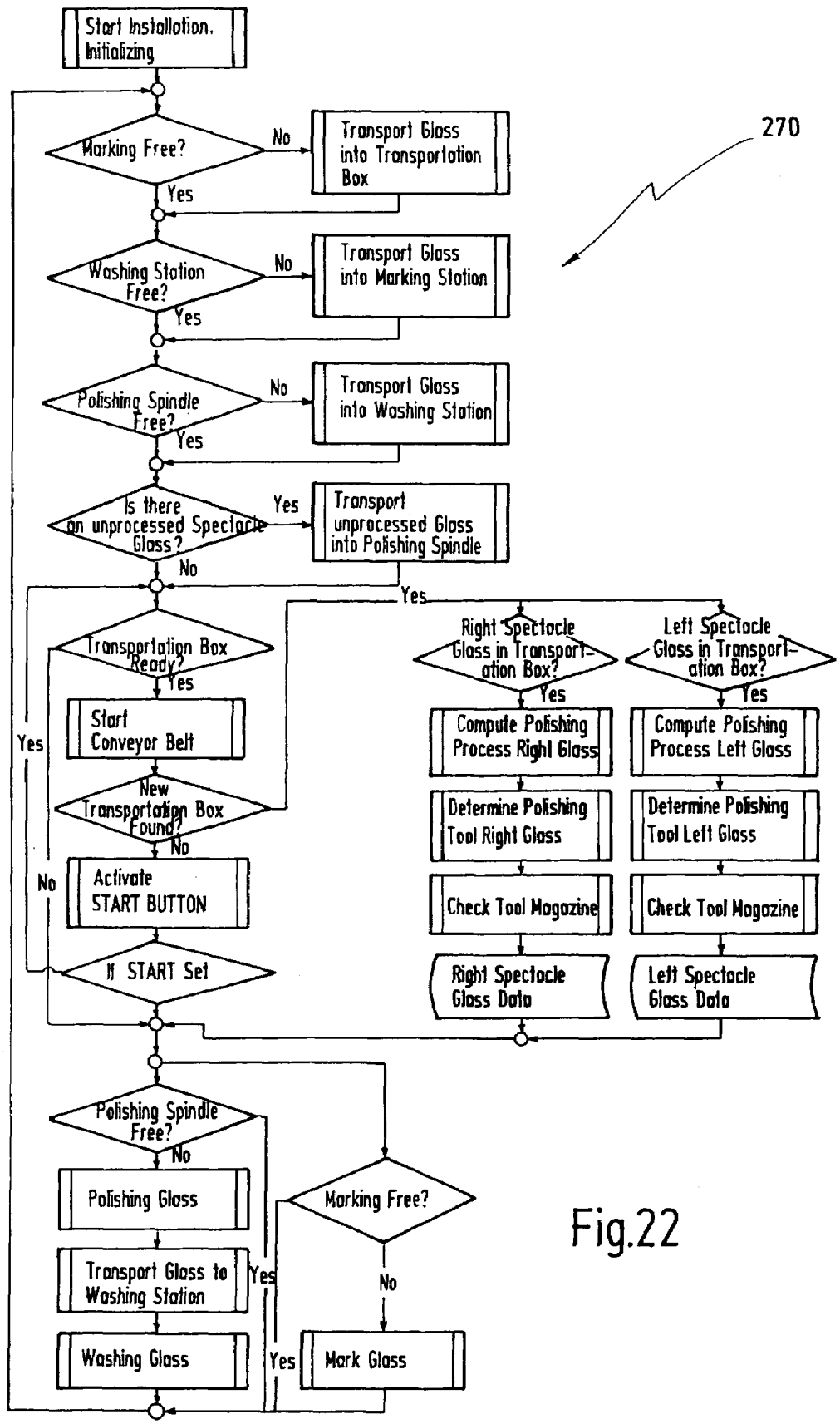
FIG. 22 shows a detailed flow chart for explaining the process according to the present invention.

Finally, FIG. 22 shows a third flow chart 270, again illustrating the afore-described sequential steps within processing cell 40. Accordingly, the lenses 50 arranged on blocks within transportation boxes 48 are processed according to the following scheme:

if marking station 58 is not free, transport marked lens 50 back into its transportation box 48 if washing station 56 is free, transport washed lens 50 into marking station 58 if polishing station 54 is free, transport polished lens 50 into washing station 56 if there is an unprocessed lens 50, transport lens 50 into polishing station 54 if there is a finished transportation box 48, start conveyor belt 44 if not, go to polishing if a transportation box 48 is found, then compute the polishing process as well as the polishing tool 88 individually for the right lens 50 and for the left lens 50 and check whether there is a polishing tool 88 within tool magazine 64 if no new transportation box is found, activate the start function if start is pushed, then go to polishing if polishing station 54 is not free, polish lens 50 according to the computed program (getting polishing tool 88, polishing, depositing polishing tool 88 in dumping magazine 90)

if marking station 58 is not free, then mark lens 50 according to the predetermined data after the polishing transport lens 50 into washing station 56 wash lens 50 go to program start.

The invention claimed is:

1. An apparatus for producing optical glasses, comprising means for applying a polishing tool against said glasses such that during polishing of said glasses said polishing tool rests with a first surface on a second surface of said glasses, wherein said first surface is smaller than said second surface, said apparatus, further, comprising means for driving said surfaces in rotation in a same direction and with essentially a same rotational speed, and means for guiding said first surface over said second surface in a manner that combines movement along a radial direction with simultaneous oscillating movement in a direction perpendicular to said radial direction.

2. The apparatus of claim 1, wherein said means for driving said surfaces in rotation comprise a hollow element.

3. The apparatus of claim 2, wherein said hollow element is a tube.

4. The apparatus of claim 3, wherein said tube is a polygonal tube, said polygonal tube being radially journalled by means of roller bearings.

5. The apparatus of claim 3, wherein said tube transmits a torque from a rotational drive to said polishing tool.

6. The apparatus of claim 1, wherein for compensating different elevations within said second surface, means are provided for feeding-in said first, rotating surface in a direction perpendicular to said second surface.

7. The apparatus of claim 6, wherein said means for feeding-in comprise a hollow element.

8. The apparatus of claim 7, wherein said hollow element is a tube.

9. The apparatus of claim 6, wherein said element is connected to a linear displacement unit by means of a spherically journalled, non torque-transmitting transmission element.

10. The apparatus of claim 9, wherein said linear displacement unit is configured as a piston-cylinder unit.

11. The apparatus of claim 9, wherein said transmission element is a coupling rod.

12. The apparatus of claim 11, wherein said coupling rod is spherically journalled at both ends.

13. The apparatus of claim 6, wherein said means for feeding-in comprise a piston-cylinder unit, said piston-cylinder unit comprising a piston being air-mounted within a cylinder.

14. The apparatus of claim 13, wherein said cylinder is a glass cylinder and said piston is a graphite piston.

15. The apparatus of claim 13, wherein said piston-cylinder unit is connected to a working reservoir containing compressed air and having a first predetermined volume, said piston defining a second predetermined volume within said cylinder between its extreme operational positions, and said first volume being much bigger than said second volume.

16. The apparatus of claim 15, wherein said first volume is at least 100 times as big as said second volume.

17. The apparatus of claim 15, wherein said first volume is at least 1,000 times as big as said second volume.

18. The apparatus of claim 17, wherein said first volume is essentially 1 cm$^3$ and said second volume is essentially 3,000 cm$^3$.

19. The apparatus of claim 6, wherein said means for feeding-in comprise a transmission element, said transmission element being linearly moved relative to a housing and protruding with a section from an end of said housing in an oscillating manner, a first bellows being arranged between said end and said section.

20. The apparatus of claim 19, wherein said section carries an annular flange, said first bellows connecting said flange with said end.

21. The apparatus of claim 6, wherein said means for feeding-in comprise a transmission element, said transmission element being adapted to be linearly moved relative to a housing and protruding with a section from an end of said housing in an oscillating manner, said section being surrounded by a protective sleeve connected to said housing.

22. The apparatus of claim 6, wherein said means for feeding-in comprise a transmission element, said transmission element being linearly moved relative to a housing and protruding with a section from an end of said housing in an oscillating manner, a first bellows being arranged between said end and said section, said section being surrounded by a protective sleeve connected to said housing, and said protective sleeve surrounding said first bellows.

23. The apparatus of claim 6, wherein said polishing tool is pivotably journalled in a transmission element, said transmission element being movable in a feeding-in direction along an axis, wherein, further, a tumbling disk is provided, said tumbling disk being connected with said transmission element via a spherical joint, said tumbling disk being adapted to be coupled to said polishing tool.

24. The apparatus of claim 23, wherein said transmission element has a ball head as a terminal end, said polishing tool being provided with a ball socket, and said polishing tool being elastically held on said transmission element, wherein, further, said ball head is elastically held in a ball socket, such that said polishing tool can execute a tumbling movement relative to said transmission element.

25. The apparatus of claim 23, wherein said transmission element has a finger as an axial terminal end, said ball head being arranged at a free end of said finger.

26. The apparatus of claim 23, wherein for elastically holding said polishing tool, a second, torque-transmitting bellows is arranged between said transmission element and said polishing tool.

27. The apparatus of claim 26, wherein said second bellows surrounds said finger.

28. The apparatus of claim 24, wherein said ball socket is configured conical.

29. The apparatus of claim 1, wherein said means for driving comprise a magnetic clutch arranged between said polishing tool and a drive.

30. The apparatus of claim 29, wherein said magnetic clutch is provided with permanent magnets.

31. The apparatus of claim 29, in which for compensating different elevations within said second surface, means are provided for feeding-in said first surface in a direction perpendicular to said second surface, said polishing tool being pivotably journalled in a transmission element, said transmission element being movable in a feeding-in direction along an axis, wherein, further, a tumbling disk is provided, said tumbling disk being connected with said transmission element via a spherical joint, said tumbling disk being adapted to be coupled to said polishing tool via said magnetic clutch.

32. The apparatus of claim 31, wherein said transmission element has a ball head as a terminal end, said polishing tool being provided with a ball socket, and said polishing tool being elastically held on said transmission element, wherein, further, said ball head is elastically held in said ball socket, such that said polishing tool can execute a tumbling movement relative to said transmission element.

* * * * *